United States Patent
Zinni

(10) Patent No.: US 7,354,248 B2
(45) Date of Patent: Apr. 8, 2008

(54) ELASTOMERIC BEARING ELEMENTS FOR DROOP STOP MECHANISMS

(75) Inventor: David A. Zinni, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 134 days.

(21) Appl. No.: 11/251,732

(22) Filed: Oct. 17, 2005

(65) Prior Publication Data

US 2007/0086894 A1    Apr. 19, 2007

(51) Int. Cl.
*B64C 11/12* (2006.01)
(52) U.S. Cl. .............. 416/134 A; 416/134 R; 416/140; 267/141; 267/294
(58) Field of Classification Search ............ 416/134 A, 416/134 R, 140; 267/141.1, 147.7, 294
See application file for complete search history.

(56) References Cited

U.S. PATENT DOCUMENTS

| | | | |
|---|---|---|---|
| 3,862,812 A * | 1/1975 | Gomdt et al. ............... 416/141 |
| 3,932,059 A | 1/1976 | Rybicki ...................... 416/140 |
| 4,203,708 A | 5/1980 | Rybicki ...................... 416/134 |
| 4,368,006 A | 1/1983 | Ferris et al. ................ 415/140 |
| 4,549,852 A | 10/1985 | Hibyan ....................... 416/140 |
| 4,886,419 A * | 12/1989 | McCafferty ............. 416/134 A |
| 4,895,354 A * | 1/1990 | Byrnes ..................... 267/141.1 |
| 5,116,206 A | 5/1992 | Adahan ...................... 417/234 |
| 5,442,993 A * | 8/1995 | Baliotti et al. ................. 92/84 |
| 5,601,408 A * | 2/1997 | Hunter et al. ........... 416/134 A |
| 6,309,182 B1 | 10/2001 | Muylaert .................... 416/140 |

* cited by examiner

*Primary Examiner*—Igor Kershteyn
(74) *Attorney, Agent, or Firm*—Ohlandt, Greeley, Ruggiero & Perle, L.L.P.

(57) ABSTRACT

An elastomeric bearing element having an outer race, an inner race, and at least two elastomeric segments secured between the inner and outer races is provided. The elastomeric segments are spaced from one another by a corresponding number of expansion segments. The elastomeric segments provide a first spring rate when a first force applied to the outer race places the elastomeric segments in compression and a second spring rate when a second force applied to the outer race places the elastomeric segments in shear. The second spring rate is lower than the first spring rate.

11 Claims, 5 Drawing Sheets

ELASTOMERIC BEARING ELEMENTS FOR DROOP STOP MECHANISMS

BACKGROUND OF THE INVENTION

1. Field of the Invention

The present disclosure is related to elastomeric bearing elements. More particularly, the present disclosure is related to elastomeric bearing elements for droop stop mechanisms.

2. Description of Related Art

Helicopters and other rotorcraft typically include a plurality of rotor blades coupled to a hub. The hub rotates the blades to provide lift and/or propulsion to the rotorcraft. It is common for the blades to droop in the absence of centrifugal forces imparted on the blades from rotation of the hub. Often times, during start-up and shutdown of the rotor, the droop of the blades is sufficient to cause the blades to contact the fuselage of the helicopter or other ground objects, or be susceptible to large flapping motions from wind gusts. The droop of the blades in articulated rotor assemblies, where the assembly includes an articulating hinge and flap bearings at the attachment point between the blades and the hub, can be particularly problematic.

The hubs of most modern helicopters include a droop stop mechanism for each blade to counter act this effect. The droop stop mechanism restrains the vertical motion of the blade when the hub is static or at low speeds experienced during start-up and shutdown (hereinafter referred to individually and collectively as "static"). As such, droop stop mechanisms typically include a cam, which rotates or pivots in response to the centrifugal forces imparted by the rotation of the hub. The cam restrains the blade during the static state, but pivots during dynamic rotation to disengage from the blade.

It has been determined that there is a need for elastomeric bearing elements and droop stop mechanisms having such elements that mitigate and/or absorb impact loads imparted on the hub by the blades when the droop stop mechanism is in its dynamic position.

BRIEF SUMMARY OF THE INVENTION

It is an object of the present disclosure to provide an elastomeric bearing element that provides a first spring rate when in a first position and a second, lower spring rate in a second position.

It is another object of the present disclosure to provide a droop stop mechanism that supports a blade in a static position and absorbs blade impact in a dynamic position.

These and other objects and advantages of the present disclosure are provided by an elastomeric bearing element having an outer race, an inner race, and at least two elastomeric segments secured between the inner and outer races. The elastomeric segments are spaced from one another by a corresponding number of expansion segments. The elastomeric segments provide a first spring rate when a first force applied to the outer race places the elastomeric segments in compression and a second spring rate when a second force applied to the outer race places the elastomeric segments in shear. The second spring rate is lower than the first spring rate.

A droop stop mechanism is also provided. The mechanism includes an elastomeric bearing element moveable between a static position and a dynamic position, a first support area secured to the elastomeric bearing assembly, and a second support area secured to the elastomeric bearing assembly. The first support area contacts a rotor blade assembly in the static position, while the second support area is positioned for impact by the rotor blade assembly in the dynamic position. The elastomeric bearing element has a first spring rate in the static position and a second spring rate in the dynamic position. The second spring rate is lower than the first spring rate.

A rotor hub having a hub body, a plurality of rotor blade assemblies on the hub body, and a droop stop mechanism is provided. The droop stop mechanism is pivotally secured to the hub body by an elastomeric bearing element for movement between a static position and a dynamic position. The elastomeric bearing element has a first spring rate in the static position and a second spring rate in the dynamic position. The second spring rate is lower than the first spring rate.

The above-described and other features and advantages of the present disclosure will be appreciated and understood by those skilled in the art from the following detailed description, drawings, and appended claims.

DETAILED DESCRIPTION OF THE INVENTION

Figure 1:
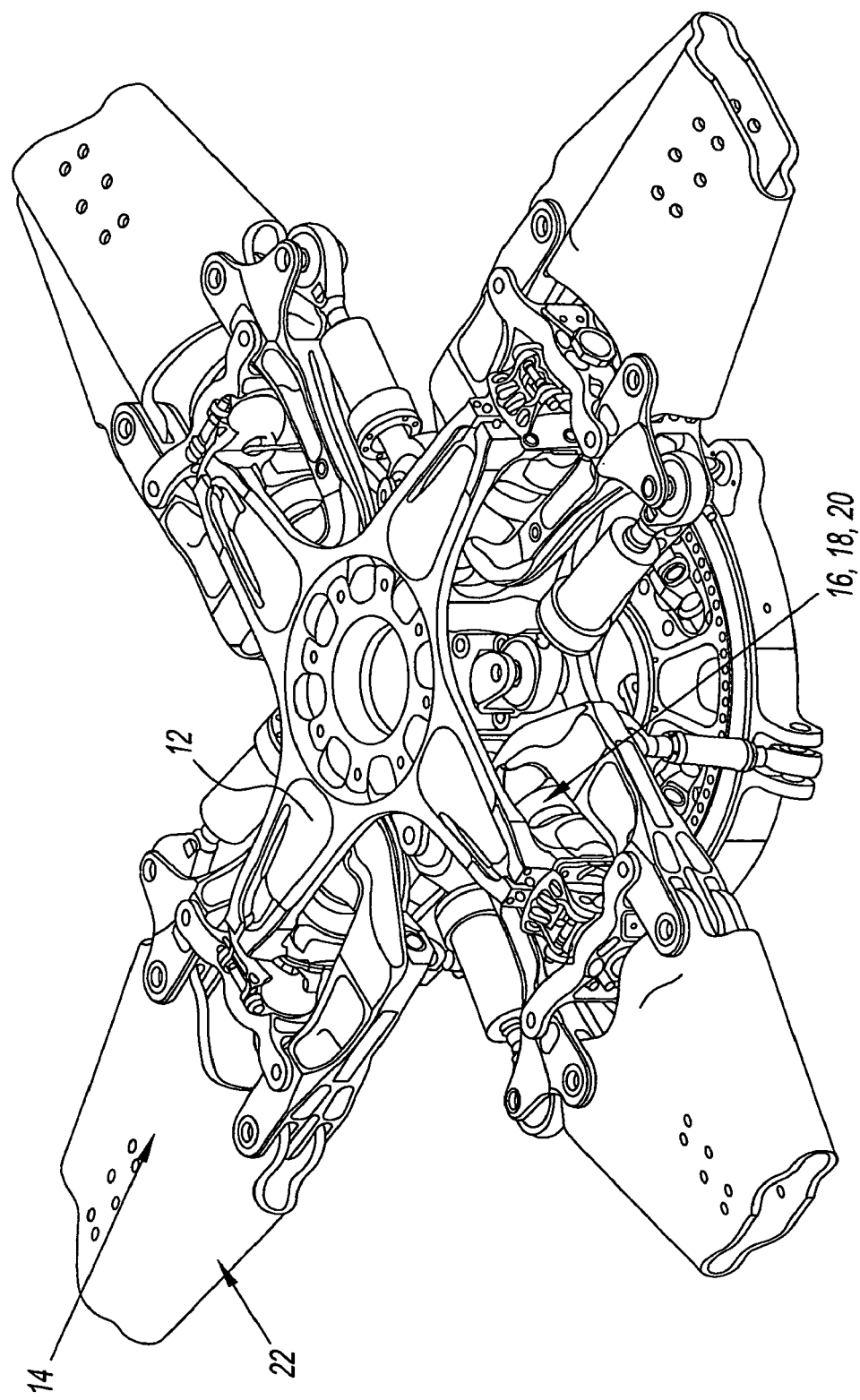
FIG. 1 is a perspective view of a rotor hub including a plurality of droop stop mechanisms according to the present disclosure.

Referring to the drawings and in particular to FIG. 1, a rotor hub for a helicopter or other rotorcraft is illustrated generally at 10. Rotor hub 10 includes a hub body 12 having a plurality of rotor blade assemblies 14. Each rotor blade assembly 14 includes a flap hinge 16, a pitch hinge 18, and a lead-lag hinge 20 for enabling movement of the assembly in all planes relative to hub body 12. Each rotor blade assembly 14 also includes a mount 22 for securing to a rotor blade (not shown).

In addition, rotor hub 10 includes a droop stop mechanism 24 disposed between each rotor blade assembly 14 and hub body 12. Droop stop mechanism 24 is configured to support rotor blade assembly 14 and, thus, mitigate rotation of about flap hinge 16, in the absence of centrifugal forces.

It should be recognized that droop stop mechanism 24 is described herein in use with a fully articulating rotor hub 10, namely a rotor hub having flap hinge 16, pitch hinge 18, and lead-lag hinge 20. Of course, droop stop mechanism 24 according to the present disclosure finds use with other, non-fully articulating rotor hubs.

Figure 2:
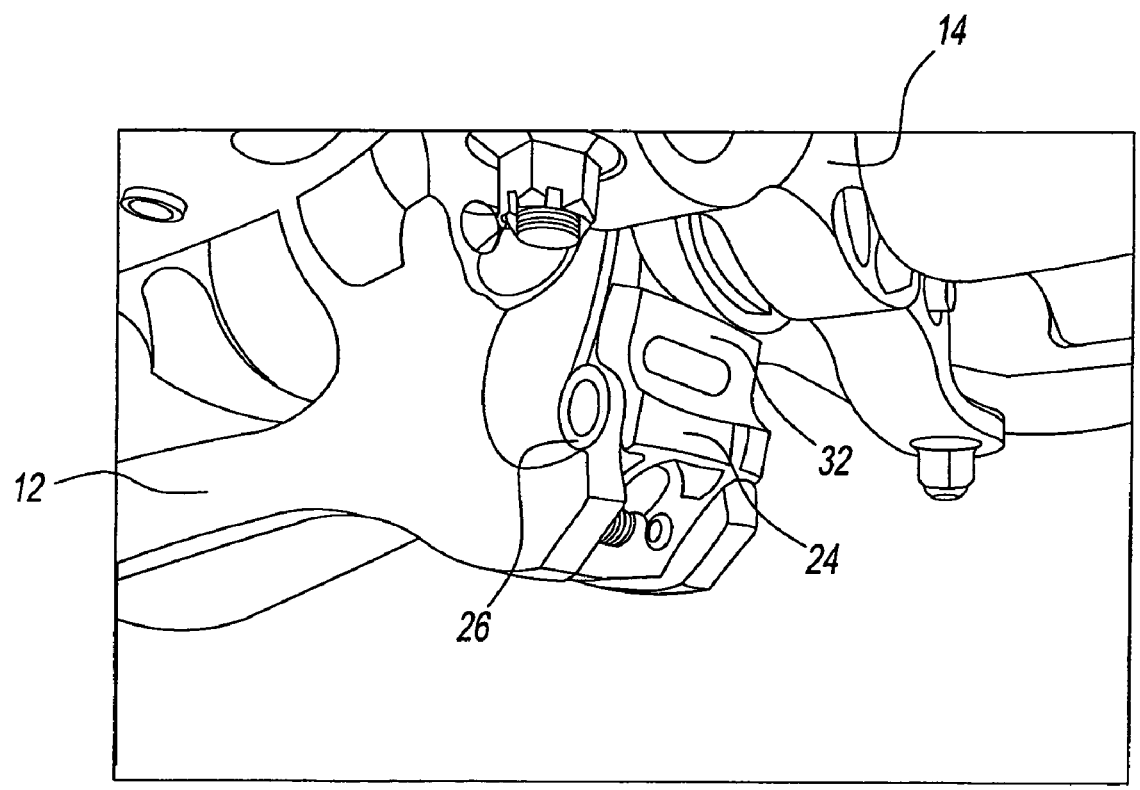
FIG. 2 is a perspective view of the droop stop mechanism of FIG. 1.
Figure 3:
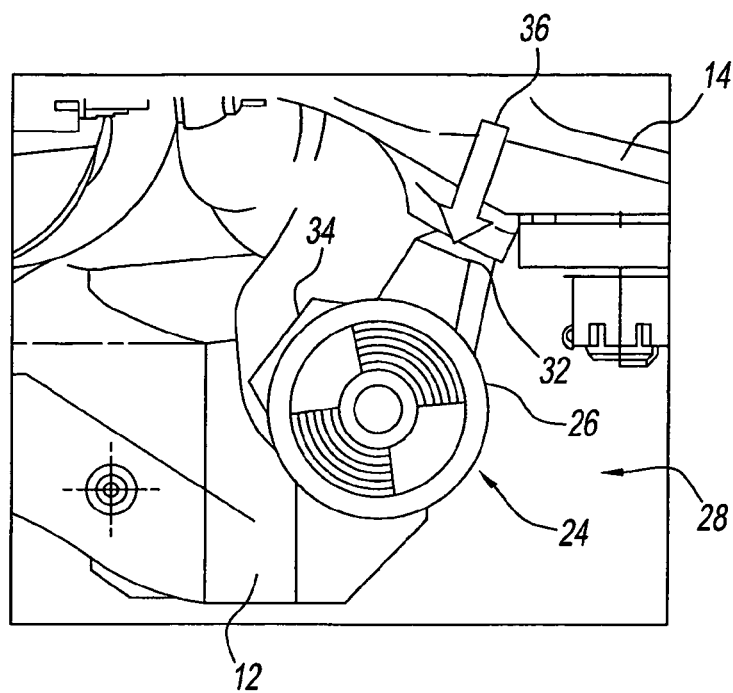
FIG. 3 is a sectional view of the droop stop mechanism of FIG. 2, in a static position.
Figure 4:
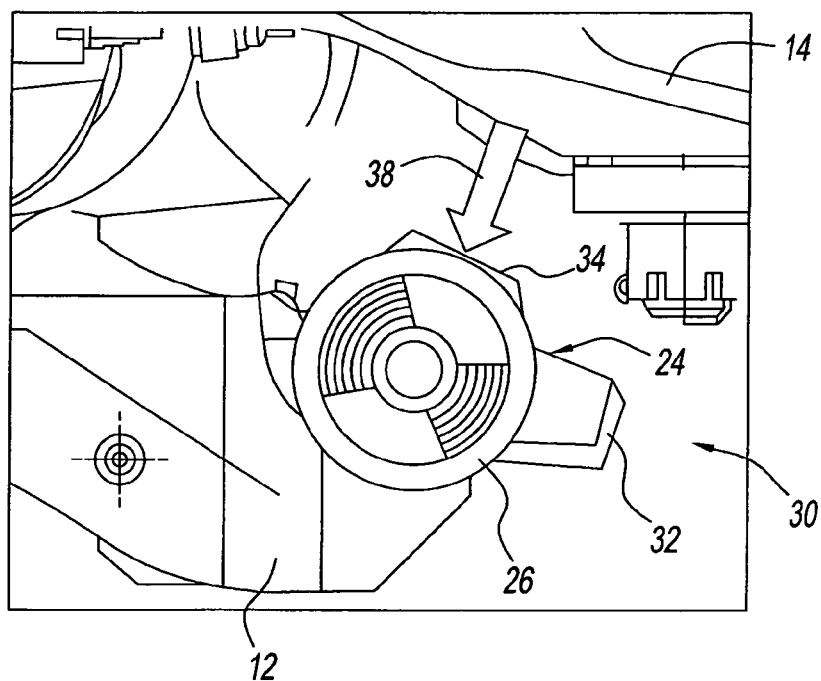
FIG. 4 is a sectional view of the droop stop mechanism of FIG. 2, in a dynamic position.

Referring now to FIGS. 2 through 4, droop stop mechanism 24 is pivotally secured to hub body 12 by an elastomeric bearing element 26. Bearing element 26 allows droop stop mechanism 24 to pivot between a first or static position 28 illustrated in FIGS. 2 and 3 and a second or dynamic position 30 illustrated in FIG. 4.

Advantageously, bearing element 26 provides droop stop mechanism 24 with a first spring rate when in static position 28, but a second, lower spring rate when in dynamic position 30. In this manner, droop stop mechanism 24 can support rotor blade assembly 14 in the static position 28 and cushion the rotor blade assembly from impact on the droop stop mechanism in dynamic position 30.

Droop stop mechanism 24 can pivot between static and dynamic positions 28, 30 in a known manner. For example, droop stop mechanism 24 can have a center of mass such that it pivots from static position 28 and to dynamic position 30 in response to centrifugal forces imparted on the mechanism at rotor speeds above a predetermined limit, such as about 50% of the maximum rotor speed. In addition, droop stop mechanism 24 can include a return spring (not shown) for pivoting the droop stop mechanism from dynamic position 30 back to static position 28 at speeds below the predetermined limit.

Droop stop mechanism 24 includes a first support area 32 and a second support area 34 that pivot with droop stop mechanism 24 between static and dynamic positions 28, 30.

In static position 28, droop stop mechanism 24 is positioned so that rotor blade assembly 14 is supported by first support area 32 as shown in FIGS. 2 and 3. In dynamic position 30, rotor blade assembly 14 is lifted from droop stop mechanism 24. Here, second support area 34 is positioned beneath rotor blade assembly 14.

Rotor blade assembly 14 imparts a first or static force 36 on bearing element 26 in static position 28. Under certain circumstances, rotor hub 10 is exposed to conditions sufficient to cause rotor blade assembly 14 to impact second support area 34 of droop stop mechanism 24 in dynamic position 30. For example, helicopter or other rotorcraft can experience blade assembly 14 to droop stop mechanism 24 impact loads during some conditions such as, but not limited to taxi, run-on landings, sloped landings. Thus, rotor blade assembly 14 can also impart a second or dynamic force 38 on bearing element 26 in dynamic position 30.

Second force 38 can be very high in magnitude relative to other flight loads, adversely affecting rotor hub 10 and/or blade assembly 14. The resulting damage of rotor hub 10 and/or blade assembly 14 due to second force 38 is, in many cases, a limiting factor in determining replacement times for the various components of the rotor hub and/or the blade assembly.

Bearing element 26 provides droop stop mechanism 24 with a first spring rate when in static position 28 to absorb static force 36 and, thus, support rotor blade assembly 14. In addition, bearing element 26 provides droop stop mechanism 24 with a second, lower spring rate when in dynamic position 30 to absorb dynamic force 38 and, thus, mitigate the impact loads on rotor hub 10.

Figure 5:
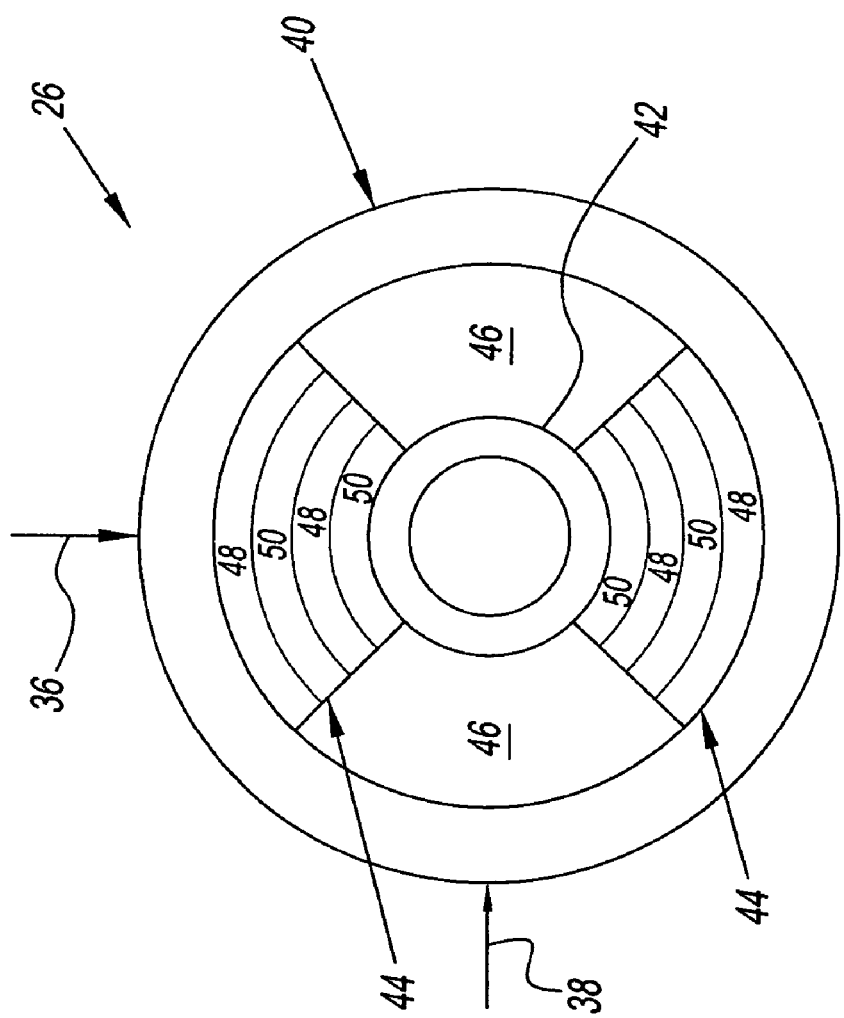
FIG. 5 is a sectional view of an elastomeric bearing element according to the present disclosure.

Referring now to FIG. 5, bearing element 26 includes an outer race 40, an inner race 42, and a plurality of elastomeric segments 44 separated by a plurality of expansion segments 46. Elastomeric segments 44 are bonded or laminated to outer and inner races 40, 42.

Outer race 40 is, preferably, a metal or other structurally rigid material sufficient to transmit static and dynamic forces 36, 38 to elastomeric and expansion segments 44, 46. Outer race 40 can be secured in droop stop mechanism 24 by, for example, press fitting the outer race into the droop stop mechanism.

Inner race 42 is, preferably, a metal or other structurally rigid material sufficient to pivotally support bearing element 26 on hub body 12. In a preferred embodiment, inner race 42 can be a metallic bolt sleeve through which a mounting bolt (not shown) is received.

In use, outer race 40 transmits static and dynamic forces 36, 38 to elastomeric segments 44. In static position 28, outer race 40 transmits static force 36 to elastomeric segments 44 as a compressive force. In contrast, outer race 40 transmits dynamic force 38 as a shear force in dynamic position 30 to elastomeric segments 44.

Since the compressive modulus of elastomeric segments 44 is higher than the shear modulus of the elastomeric segments, the first spring rate is higher than the second spring rate. Thus, bearing element 26 provides a first spring rate when in static position 28, but a second spring rate when in dynamic position 30.

Preferably, bearing element 26 has a first or static spring rate of about 2,500,000 in-lbs/rad at static position 28 and a second or dynamic spring rate of about 70,000 in-lbs/rad at dynamic position 30. It has been determined by the present disclosure that bearing element 26 having the first and second spring rates is sufficient to support rotor blade assembly 14 in static position 28, allowing only deflections of the blades of about 0.03 in. for typical 2G moment, while absorbing impact loads imparted on rotor hub 10 in dynamic position 30.

Expansion segments 46 provide an area into which elastomeric segments 44 can expand during receipt of static or dynamic force 36, 38. In a preferred embodiment, expansion segments 46 are open areas. Of course, it is contemplated by the present disclosure for expansion segments 46 to include other materials such as gases, elastomers, and the like.

In a preferred embodiment, elastomeric segments 44 include at least two diametrically opposed arcs formed of a plurality of elastomer layers 48 and a plurality of shim layers 50 laminated to one another. Elastomer layers 48 are generally semi-cylindrical in shape, preferably made of a material that substantially maintains its physical properties when exposed to various environmental conditions present at rotor hub 10 such as, but not limited to, UV light exposure and high/low temperature conditions. For example, elastomer layers 48 can be made of a material such as, but not limited to, silicone and other synthetic elastomers.

Shim layers 50 are semi-cylindrical in shape preferably made of a metal or composite material. Shim layers 50 are bonded to elastomer layers 48 to form a laminate. The alternating elastomer-shim laminate provides compressive stiffness to bearing element 26 by limiting the bulge deformation of the elastomer layers 48 and allowing the variation of elastomer modulus within the laminate for strain optimization of the bearing element.

In a preferred embodiment, elastomeric layers 48 are made of materials that have a bulk or static modulus of about 200 psi (pounds-per-square inch) and a radial thickness (i.e, distance between outer and inner races 40, 42) of at least about 0.5 inches to about 1.0 inches with about 0.7 in. being most preferred.

It should be recognized that bearing element 26 is described herein by way of example in use with a droop stop mechanism 24. Of course, it is contemplated by the present disclosure for bearing element 26 to find use with other devices, including non-centrifugally actuated devices, requiring a first level of support in one state and a second level of support in a second state. For example, bearing element 26 can find use with rotor blade flap restrainers or anti-flap mechanisms, which have similar requirements and are damaged when contacted under dynamic conditions. Anti flap mechanisms operate in the same way as droop stop mechanism 24, but restrain rotor blade assembly 14 from motions towards the top of the blade.

It should also be recognized that bearing element 26 is described herein by way of example as cylindrical in shape. Of course, it is contemplated by the present disclosure for bearing element 26 to be spherical in shape, similar to a rod end type bearing. In this manner, bearing element 26 can provide both vertical and side load absorption capabilities.

Bearing element 26 is described herein by way of example as a separate device assembled to droop stop mechanism 24. However, it is contemplated by the present disclosure for bearing element 26 to be an integral part of droop stop mechanism 24 where, inner and outer races form a part of the droop stop mechanism.

Advantageously, rotor hub 10 including bearing element 26 has increased retirement times for hub by 12 and rotor blade assemblies 14 typically affected by droop pounding loads. The result is reduced maintenance and operating costs and increased structural reliability of rotor components.

Figure 6:
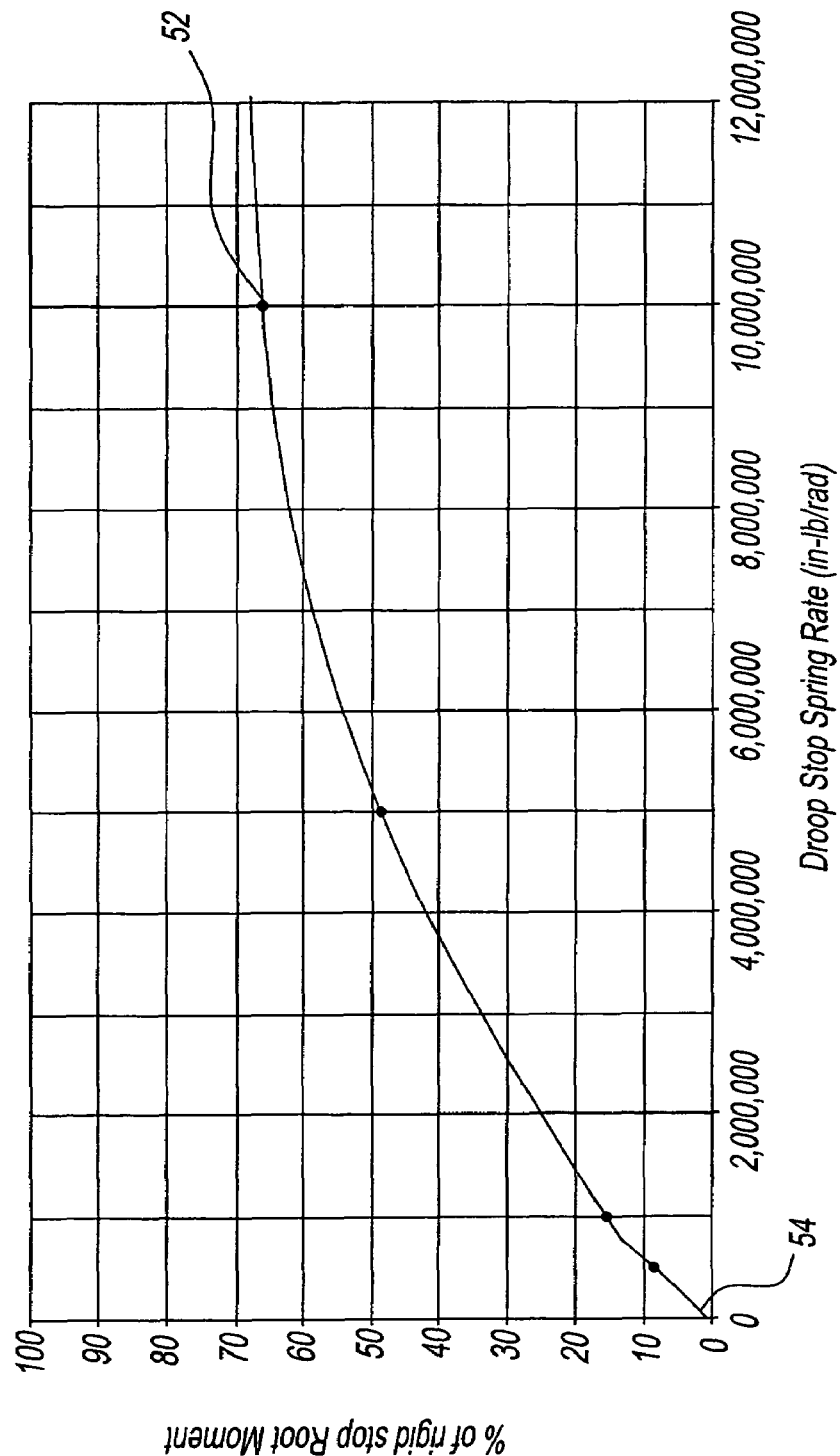
FIG. 6 illustrates the results of a rotor blade droop stoop impact study according to the present disclosure.

Referring now to FIG. 6, an analysis of the dynamic root moment at various droop stop stiffnesses was performed using an aero-elastic response analysis program. Prior art droop stop mechanisms typically have a spring rate 52 of about 10,000,000 in-lbs/rad in both the static and dynamic positions. As can be seen, bearing element 26 has a spring rate of the same order of magnitude as the prior art spring rates 52, when oriented in the static position. However, bearing element 26 provides a second or dynamic spring rate 54 of about 70,000 in-lbs/rad. Accordingly, bearing element 26 provides a dramatic reduction in the spring rate in the dynamic position as compared to the spring rate of prior art droop stops in the dynamic position, while providing a similar spring rate to that of the prior art droop stops in the static position.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A droop stop mechanism, comprising:
   an elastomeric bearing element moveable between a static position and a dynamic position;
   a first support area secured to said elastomeric bearing assembly, said first support area contacting a rotor blade assembly in said static position; and
   a second support area secured to said elastomeric bearing assembly, said second support area being positioned for impact by the rotor blade assembly in said dynamic position, said elastomeric bearing element having a first spring rate in said static position and a second spring rate in said dynamic position, said second spring rate being lower than said first spring rate.

2. The mechanism of claim 1, wherein said second spring rate is sufficient to cushion impact of a rotor blade assembly on the droop stop mechanism.

3. The mechanism of claim 1, wherein said elastomeric bearing element moves from said static position to said dynamic position in response to centrifugal force.

4. The mechanism of claim 1, wherein said elastomeric bearing element moves from said dynamic position to said static position in response to a spring force.

5. The mechanism of claim 1, wherein said elastomeric bearing element comprises:
   an outer race;
   an inner race; and
   a pair of elastomeric segments spaced from one another by a pair of expansion segments, said pair of elastomeric segments providing said first spring rate in said static position and said second spring rate in said dynamic position.

6. The mechanism of claim 5, wherein said pair of elastomeric segments each comprise a plurality of elastomer layers and a plurality of shim layers laminated to said plurality of elastomer layers.

7. The mechanism of claim 1, wherein said first spring rate is about 2,500,000 in-lbs/rad and said second spring rate is about 70,000 in-lbs/rad.

8. A rotor hub comprising:
   a hub body;
   a plurality of rotor blade assemblies depending from said hub body; and
   a droop stop mechanism pivotally secured to said hub body by an elastomeric bearing element for movement of said droop stop mechanism and said elastomeric bearing element between a static position and a dynamic position, said elastomeric bearing element having a first spring rate in said static position and a second spring rate in said dynamic position, said second spring rate being lower than said first spring rate, wherein said droop stop mechanism comprises a first support area configured to contact a respective one of said plurality of rotor blade assemblies in said static position and a second support area configured to contact said respective one of said plurality of rotor blade assemblies in said dynamic position.

9. The rotor hub of claim 8, wherein said elastomeric bearing element comprises:
   an outer race secured to said first and second support areas;
   an inner race pivotally secured to said hub body; and
   a pair of elastomeric segments spaced from one another by a pair of expansion segments, said pair of elastomeric segments providing said first spring rate in said static position and said second spring rate in said dynamic position.

10. The rotor hub of claim 9, wherein said pair of elastomeric segments each comprise a plurality of elastomer layers and a plurality of shim layers laminated to said plurality of elastomer layers.

11. The rotor hub of claim 8, wherein said first spring rate is about 2,500,000 in-lbs/rad and said second spring rate is about 70,000 in-lbs/rad.

* * * * *